United States Patent
Bartolome

(10) Patent No.: US 9,573,338 B2
(45) Date of Patent: Feb. 21, 2017

(54) COMPOSITE SANDWICH PANEL WITH DIFFERENTIAL RESIN LAYERS

(71) Applicant: B/E Aerospace, Inc., Wellington, FL (US)

(72) Inventor: Alvin S. Bartolome, Eastvale, CA (US)

(73) Assignee: B/E AEROSPACE, INC., Wellington, FL (US)

( * ) Notice: Subject to any disclaimer, the term of this patent is extended or adjusted under 35 U.S.C. 154(b) by 48 days.

(21) Appl. No.: 14/631,770

(22) Filed: Feb. 25, 2015

(65) Prior Publication Data

US 2015/0239200 A1 Aug. 27, 2015

Related U.S. Application Data

(60) Provisional application No. 61/945,344, filed on Feb. 27, 2014.

(51) Int. Cl.
*B32B 3/00* (2006.01)
*B32B 3/12* (2006.01)
(Continued)

(52) U.S. Cl.
CPC . *B32B 3/12* (2013.01); *B32B 5/02* (2013.01); *B32B 5/12* (2013.01); *B32B 5/145* (2013.01); *B32B 5/28* (2013.01); *B32B 7/02* (2013.01); *B32B 7/04* (2013.01); *B32B 7/045* (2013.01); *B32B 27/04* (2013.01); *B32B 27/28* (2013.01); *B32B 27/42* (2013.01); *B32B 37/146* (2013.01); *B32B 2037/0092* (2013.01); *B32B 2250/03* (2013.01); *B32B 2250/40* (2013.01); *B32B 2255/02* (2013.01); *B32B 2260/021* (2013.01); *B32B 2260/046* (2013.01); *B32B 2262/106* (2013.01); *B32B 2305/076* (2013.01); *B32B 2307/718* (2013.01); *B32B 2307/738* (2013.01);
(Continued)

(58) Field of Classification Search
None
See application file for complete search history.

(56) References Cited

U.S. PATENT DOCUMENTS 6,429,157 B1 8/2002 Kishi et al.
6,440,257 B1 8/2002 Zhou et al.
(Continued)

FOREIGN PATENT DOCUMENTS

EP 1055513 A1 * 11/2000 ............... B32B 3/12
WO 0073055 A1 12/2000

OTHER PUBLICATIONS

International Search Report, Jul. 3, 2015, 3 pages, from PCT/US2015/017847, published as WO 2015/130985 on Sep. 3, 2015.
(Continued)

*Primary Examiner* — David Sample
*Assistant Examiner* — Nicholas W Jordan
(74) *Attorney, Agent, or Firm* — Oblon, McClelland, Maier & Neustadt, L.L.P.

(57) ABSTRACT

A composite panel includes a honeycomb core sandwiched by a pair of skins that are attached directly to the core with no separate adhesive layer. The skins are impregnated with a resin material that is unevenly distributed between first and second surfaces, and direct contact is established between the surfaces with the greater resin distribution and the core, reducing weight and eliminating the manufacturing step of incorporating an adhesive layer therebetween.

13 Claims, 2 Drawing Sheets

(51) Int. Cl.
  *B32B 5/02*    (2006.01)
  *B32B 27/28*   (2006.01)
  *B32B 7/02*    (2006.01)
  *B32B 5/12*    (2006.01)
  *B32B 5/14*    (2006.01)
  *B32B 5/28*    (2006.01)
  *B32B 7/04*    (2006.01)
  *B32B 27/04*   (2006.01)
  *B32B 27/42*   (2006.01)
  *B32B 37/14*   (2006.01)
  *B32B 37/00*   (2006.01)

(52) U.S. Cl.
  CPC ........ *B32B 2398/10* (2013.01); *B32B 2605/18* (2013.01); *B32B 2607/00* (2013.01); *Y10T 428/2495* (2015.01); *Y10T 428/24165* (2015.01)

(56) References Cited

U.S. PATENT DOCUMENTS

| | | |
|---|---|---|
| 2006/0004714 A1 | 1/2006 | Popescu |
| 2006/0204714 A1* | 9/2006 | Wang ........................ B32B 3/12 428/116 |

OTHER PUBLICATIONS

Teklam, Product Data Sheet for Typical Average Property Values, 1 page, http://www.teklam.com/teklam_A502_panel.html, available May 26, 2016.

* cited by examiner

COMPOSITE SANDWICH PANEL WITH DIFFERENTIAL RESIN LAYERS

CROSS-REFERENCES TO RELATED APPLICATIONS

This application is based upon and claims priority from U.S. Provisional Application No. 61/945,344, filed Feb. 27, 2014, incorporated by reference in its entirety.

BACKGROUND

Composite sandwich panels are used in a wide variety of applications where high strength and light weight are required. These panels may include a lightweight honeycomb core for greater strength because of its high strength to weight ratio and resistance to fatigue failures. These panels are particularly well suited for the aircraft industry. The honeycomb cores may be made from a wide variety of materials, as can the face sheets that sandwich the honeycomb structures.

Typically, an adhesive is used to bond the face sheets to the core. The adhesive must rigidly attach the facings or skins to the core in order for loads to be transmitted from one facing to the other. If the adhesive fails, the strength of the panel is severely compromised. The adhesive is especially critical in sandwich panels which use honeycomb as the core because of the relatively small surface area over which the edges of the honeycomb contact the face sheets.

One procedure for applying composite face sheets to honeycomb involves forming a prepreg sheet that includes at least one fibrous reinforcement layer and an uncured resin matrix. Prepreg is a common term for fabric reinforcement that has been pre-impregnated with a resin system. The resin system is typically an epoxy that already includes the proper curing agent. As a result, the fabric is ready to lay into a mold without the addition of additional resin and without the steps required of a typical hand lay-up. These pre-impregnated composite fabrics and tapes, or "prepregs," are used in a large number of aircraft applications. A film adhesive is typically added to the prepreg honeycomb core and it is then bonded to the honeycomb by curing of both the prepreg resin and adhesive resin at an elevated temperature. The film adhesive can be applied as a separate ply layer or as an integral part of the prepreg sheet.

An alternative method of bonding the face sheets to honeycomb involves applying an adhesive to the edge of the honeycomb. The adhesive is typically applied by "dipping" the edge of the honeycomb in the adhesive. The adhesives used in this type bonding are typically referred to as "dip" resins or adhesives. The advantage of this method is that the adhesive is located only where the honeycomb contacts the face sheet, rather than being distributed over the entire face sheet. This method is generally used to bond non-adhesive face sheets, such as aluminum and other metallic face sheets, to the honeycomb.

One such composite panel is the A502 Panel intended for use in primary and secondary aerospace applications, offered by Teklam Corp. of Corona, Calif. The Teklam A502 panel includes a 2024 T3 clad aluminum facings of a thickness of 0.02" and a one quarter inch 5O52-0015-3.4 aluminum honeycomb core. This panel has an evenly distributed low resin content with an auxiliary film adhesive for bonding the layers. The film and adhesive can be represented as follows:

Prepreg (fibers with resin) with 0.02 lbs/sq ft adhesive evenly distributed throughout
Film Adhesive at 0.030 lbs/sq. ft
Honeycomb Core The overall weight of the reinforcement and resin in the foregoing example is 0.050 lbs/sq ft (0.02 prepreg and 0.03 adhesive). The manufacture of this panel requires cutting and laying up of the two materials onto the core, which adds to the manufacturing costs. From the foregoing, it can be seen that a layer resin is applied across the core in an even distribution despite the fact that it is not necessary to do so. The inclusion of the film adhesive is necessary but adds additional weight to the panel. There is a need in the aerospace industry for an improved panel that has a reduced weight through the optimization of the resin and adhesive weight and distribution along the core of the panel.

SUMMARY OF THE INVENTION

The present invention is a composite panel having a unidirectional prepreg composite panel with resin applied selectively on the contact surfaces of the mating materials in differing amounts to optimize the panel. The use of the differential resin application allows the adhesive film to be eliminated from the panel, improving the weight characteristics of the panel with no loss of strength. The resulting panel is optimized for a light-weight, high strength low cost composite panel with improved manufacturing efficiency.

DETAILED DESCRIPTION OF THE PREFERRED EMBODIMENTS

Figure 1:
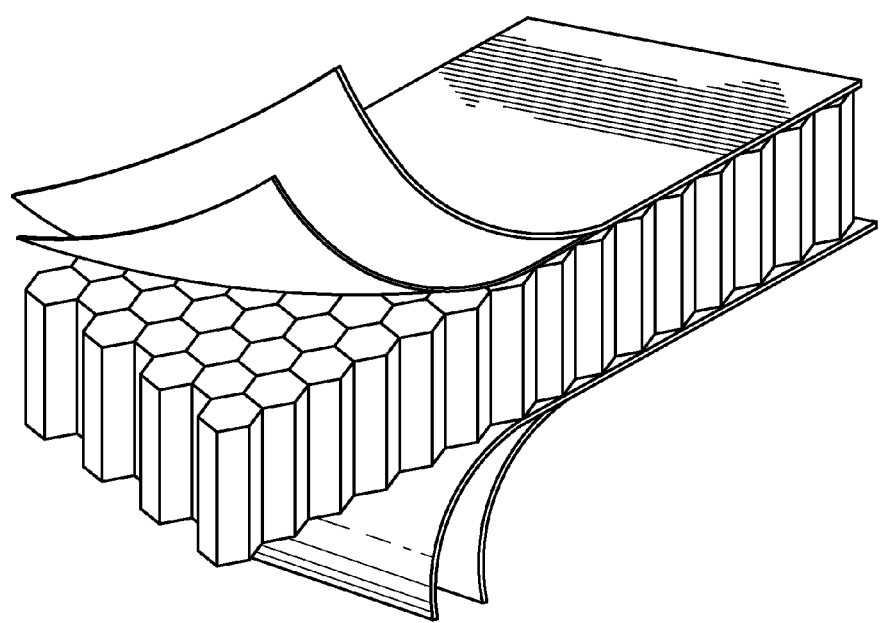
FIG. 1 is an elevated, perspective view of a prior art honeycomb core composite panel.

FIG. 1 illustrates a prior art honeycomb composite panel having a core of honeycomb material, sandwiched by two adhesive films that bond the outer skins to the panel. In this configuration, both the skins and the adhesive films must be cut and matched up precisely before the curing step. The details of the cutting and curing process is described generally in U.S. Pat. No. 7,186,310 entitled Method For Forming A Honeycomb Composite Sandwich Panel, the contents of which are fully incorporated herein by reference.

Figure 2:
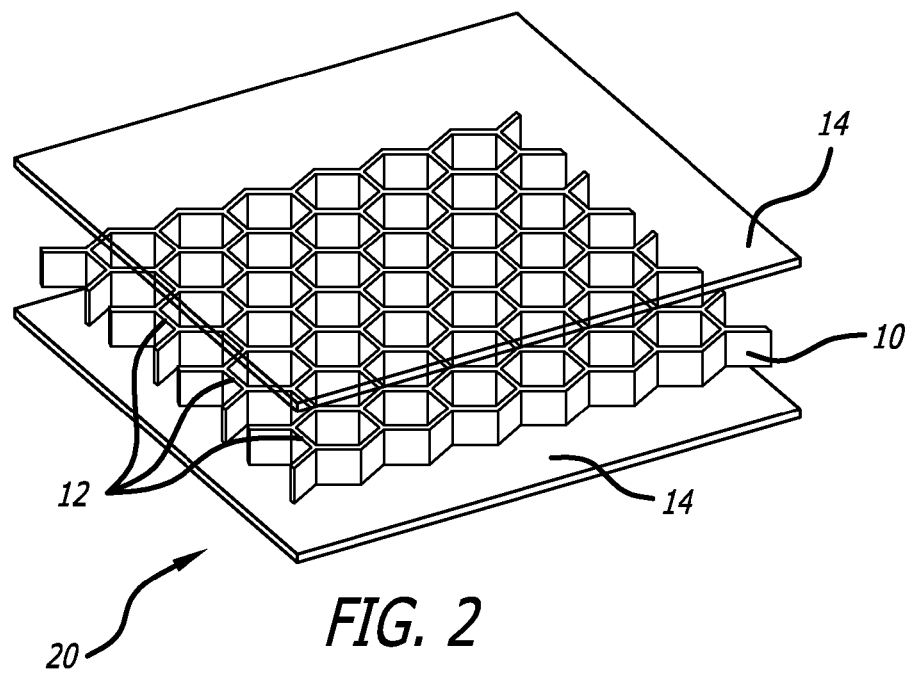
FIG. 2 is an elevated perspective view of a honeycomb core for a panel of the present invention.

FIG. 2 illustrates an improved composite panel 20 comprising a honeycomb core 10 and a pair of prepreg resin fabric sheets or skins 14. The honeycomb core 10 comprises a thin walled lattice with repeating geometric shapes, e.g. hexagonals 12. Honeycomb core is an extremely lightweight, high strength structure manufactured with an aramid fiber paper impregnated with a heat resistant resin such as a phenolic resin in some cases, and aluminum, steel, polystyrene, or polypropylene cores in other cases. The core 10 provides the necessary rigidity and strength-to-weight ratio that are needed for aerospace applications, as well as other applications for composite sandwich panels.

Figure 3:
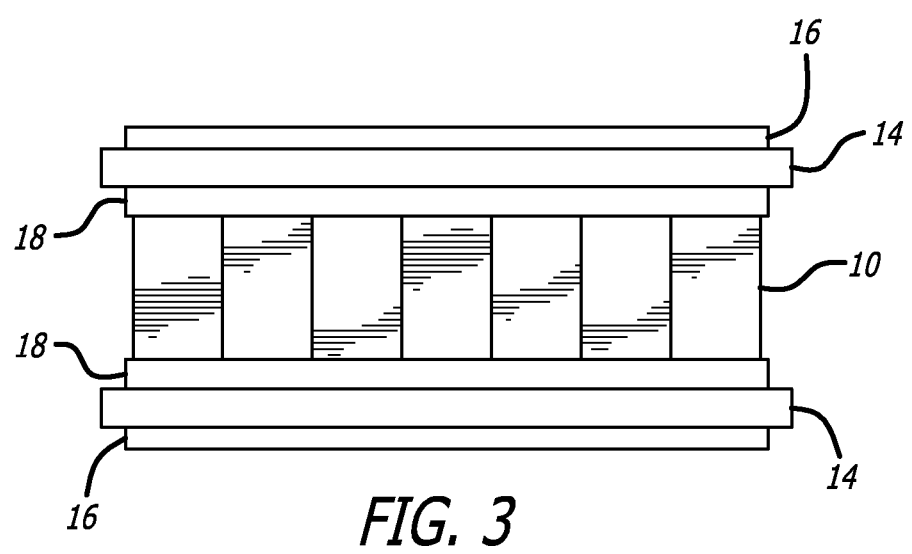
FIG. 3 is a cross-sectional view of the panel showing the differential distribution of resin on the skins.

FIG. 3 illustrates the panel of the present invention, where the honeycomb core 10 is sandwiched between plies of a unidirectional prepreg skin 14 in the present invention. The prepreg material is selected from a number of various high strength, low weight options and typically includes a selected fiber direction, weight, and overall resin content. In traditional resin fiber skins, the resin content has always been distributed evenly throughout the prepreg so that the amount of resin on one surface is equal to the amount of resin on the other surface. However, the present invention selectively establishes a different amount of resin on the outer surface of the prepreg and the inner surface with respect to the sandwich panel. This resin differential can result in significant weight savings when applied across the panel and throughout the aircraft structure.

The skins 14 are comprised of thin metallic or carbon reinforced unidirectional fabrics pre-impregnated with a resin material on both the inner and outer sides. The fabric on the present invention has an inner resin layer 18 having a thickness yielding a weight of 0.030 pounds of resin per square foot on the inner or interior surface, and an outer resin layer 16 having a thickness yielding a weight of 0.010 pounds of resin per square foot on the outer or exterior surface of the sandwich panel. By supplying a differential resin thickness, the panel can be cured without a separate adhesive sheet and the weight of the adhesive layer has thereby been eliminated from the panel 20.

In the preceding example, for example, the 0.050 lbs/sq ft of resin in the earlier example has been reduced by twenty percent to 0.040 lbs/sq ft. Moreover, elimination of the need for the application of an adhesive film greatly reduces the cost and time for manufacturing the composite panel. By allowing for differing amounts of resin on opposite sides of the fiber, the panel can reduce weight and costs by eliminating the adhesive film. An additional benefit is that there is only a single material (the prepreg 14) that requires cutting and laying up on the core, saving expense and time in the shaping process. The panel 20 of the present invention can be used to replace or substitute for any panel that incorporates the use of unidirectional prepreg and a film adhesive. Examples of such panels include aircraft floor paneling, but other examples are also replete in the industry.

The present invention allows for very purposeful placement of the resin throughout the skin material that was not available in the prior art. This yields a significant savings in cost and weight, critical factors in the aerospace industry, while maintaining optimal performance. It also obviates the need to design a panel around the use of a film adhesive to achieve adequate bond strengths.

The foregoing detailed description of the invention is not intended to be limited to any specific figure or described embodiment. One of ordinary skill would readily envision numerous modifications and variations of the foregoing examples, and the scope of the present invention is intended to encompass all such modifications and variations. Accordingly, the scope of the present invention is properly measured by the words of the appended claims using their ordinary meanings, consistent with the descriptions and depictions herein.

I claim:

1. A composite panel, comprising:
    a core having a repeating geometric shape, wherein an upper surface of the core comprises an open lattice of the repeating geometric shape, and a lower surface of the core comprises an open lattice of the repeating geometric shape;
    a first skin attached directly to the upper surface of the core with no separate adhesive film, and a second skin attached directly to the lower surface of the core with no separate adhesive film, each of the first and second skins having a thermal setting resin on an inner and an outer surface; and
    wherein a thickness of the thermal setting resin on the inner surface of the first and second skins is greater than a thickness of the thermal setting resin on the outer surface of the first and second skins.

2. The composite panel of claim 1, wherein the core is a honeycomb structure having repeating hexagonal shapes.

3. The composite panel of claim 1, wherein the first and second skins are unidirectional carbon fiber fabrics.

4. The composite panel of claim 1, wherein a layer of thermal setting resin on the inner surfaces of the first and second skins is at least 0.02 pounds per square foot greater than a layer of the thermal setting resin on the outer surfaces of the first and second skins.

5. The composite panel of claim 1, wherein the ratio of weight of an inner resin layer to weight of an outer resin layer is approximately 3:1.

6. The composite panel of claim 1, wherein the resin is a heat resistant phenolic resin.

7. A method for producing a composite panel without use of an adhesive film layer, comprising:
    stacking a stacked structure on a lower half mold of a mold, the stacked structure comprising a first prepreg sheet, a core having a repeating geometric shape, and a second prepreg sheet, wherein
        an upper surface of the core comprises an open lattice of the repeating geometric shape,
        a lower surface of the core comprises an open lattice of the repeating geometric shape, and
        the first prepreg sheet and a second prepreg sheet each have a thermal setting resin on respective inner and a respective outer surface, wherein a thickness of the thermal setting resin on the inner surfaces is greater than a thickness of the thermal setting resin on the outer surfaces, wherein, upon stacking,
            the inner surface of the first prepreg sheet directly abuts to the lower surface of the core with no separate adhesive film, and
            the inner surface of the second prepreg sheet directly abuts to the upper surface of the core with no separate adhesive film; and
    curing the stacked structure in the mold.

8. The method of claim 7, further comprising forming the first prepreg sheet and the second prepreg sheet to each have a ratio of weight of an inner resin layer to weight of an outer resin layer of approximately 3:1.

9. The method of claim 7, further comprising forming the first prepreg sheet and the second prepreg sheet to have a respective layer of thermal setting resin on the inner surfaces of at least 0.02 pounds per square foot greater than a respective layer of the thermal setting resin on the outer surfaces.

10. The method of claim 7, further comprising forming the first prepreg sheet and the second prepreg sheet using a unidirectional fabric.

11. The method of claim 10, wherein the unidirectional fabric is a unidirectional carbon fiber fabric.

12. The method of claim 7, further comprising forming the first prepreg sheet and the second prepreg sheet using a heat resistant phenolic resin.

13. The method of claim 7, wherein the core is a honeycomb structure having repeating hexagonal shapes.

* * * * *